US006939441B2

(12) United States Patent
Nurminen et al.

(10) Patent No.: US 6,939,441 B2
(45) Date of Patent: Sep. 6, 2005

(54) STOCK SIZE FOR PAPER OR BOARD MANUFACTURE, METHOD FOR PREPARATION OF SIZE, USE OF SIZE

(75) Inventors: Markku Nurminen, Ralsio (FI); Mari Niinikoski, Rusko (FI)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 174 days.

(21) Appl. No.: 10/257,634

(22) PCT Filed: Apr. 17, 2001

(86) PCT No.: PCT/FI01/00375

§ 371 (c)(1), (2), (4) Date: Oct. 16, 2002

(87) PCT Pub. No.: WO01/79607

PCT Pub. Date: Oct. 25, 2001

(65) Prior Publication Data

US 2003/0121632 A1 Jul. 3, 2003

(30) Foreign Application Priority Data

Apr. 18, 2000 (FI) ............................................ 20000928

(51) Int. Cl.$^{7}$ ............................................... D21H 17/72

(52) U.S. Cl. .................... 162/135; 162/158; 162/168.1; 162/175; 162/183; 106/206.1; 106/215.4; 524/45; 427/391; 427/395

(58) Field of Search ................................ 162/135, 158, 162/168.1, 175, 183; 106/206.1, 215.4; 524/45; 536/45, 102, 123.1, 126; 427/391, 395

(56) References Cited

U.S. PATENT DOCUMENTS

| | | | | | |
|---|---|---|---|---|---|
| 4,243,564 | A | | 1/1981 | Mavis | |
| 4,301,017 | A | | 11/1981 | Kightlinger et al. | |
| 4,835,212 | A | | 5/1989 | Degen et al. | |
| 4,892,590 | A | | 1/1990 | Gill et al. | |
| 4,925,530 | A | | 5/1990 | Sinclair et al. | |
| 5,501,771 | A | | 3/1996 | Bourson | |
| 5,527,430 | A | | 6/1996 | Gill | |
| 5,824,190 | A | | 10/1998 | Guerro et al. | |
| 5,993,604 | A | * | 11/1999 | Finlayson et al. | 162/168.1 |
| 6,156,112 | A | * | 12/2000 | Craig | 106/217.7 |
| 6,162,328 | A | * | 12/2000 | Cenisio et al. | 162/135 |
| 6,210,475 | B1 | * | 4/2001 | Dauplaise et al. | 106/209.1 |

FOREIGN PATENT DOCUMENTS

| | | |
|---|---|---|
| CA | 808 234 | 3/1969 |
| CH | 678 636 | 10/1991 |
| GB | 1 444 675 | 8/1976 |
| GB | 1505641 | 3/1978 |
| JP | 55 056178 | 4/1980 |

OTHER PUBLICATIONS

Tao Wang et al, “A new sizing agent: styrene–maleic anhydride copolymer with alum or iron mordants” TAPPI Journal, vol. 80, no. 1, 1997, pp. 277–282.

* cited by examiner

*Primary Examiner*—Peter Chin
(74) *Attorney, Agent, or Firm*—Nixon & Vandehye PC

(57) ABSTRACT

A stock size intended to be added as a solution to the pulp stock in connection with the manufacture of paper or board in order to improve the characteristics of the paper or board, e.g.), to reduce the absorption of liquids, to increase the dry strength and wet strength. The stock size contains a polymer, which is based on styrene maleic acid and stabilised with a polysaccharide, such as cationic starch. The stock size is advantageously prepared in a steam jet cooker. The stock size is suitably used as a stock size in the manufacturing of liquid packaging board.

12 Claims, No Drawings

STOCK SIZE FOR PAPER OR BOARD MANUFACTURE, METHOD FOR PREPARATION OF SIZE, USE OF SIZE

This application is the US national phase of international application PCT/FI01/00375 filed 17 Apr. 2001 which designated the U.S.

The present invention relates to a stock size, to a method for preparation of size, and to the use of size defined in the preambles of the independent claims presented below.

In the manufacture of paper and board sizing means a treatment which is mainly aimed at reducing the liquid absorption of paper or board and at increasing the strength of both dry and wet paper or board.

As cellulose fibres have a hydrophilic surface, and as the surface of the paper or board made of the fibres is porous by structure, the surface of paper and board is highly absorbent. In many paper or board products, such as liquid packaging board, fine paper, printing paper and base papers for coating, liquid absorption is a harmful property. The liquid absorption can be reduced by sizing the paper or board, either with stock size or surface size. The stock size is added to the fibre stock before the stock is supplied to the headbox of a paper machine or board machine. Surface size is used to coat the formed fibre web, for instance in the drying section at a size press.

Paper sizing has traditionally used resin size which is bonded to the cellulose fibres with the aid of alum. Therefore resin sizing can be used only at low pH levels. The final sizing of the paper, i.e. the attachment of the resin to the fibres, occurs in the drying section of the paper machine, mainly at a temperature >70° C., and when the dry solids content has reached a level >60%.

Neutral or alkalic sizing uses synthetic sizes which do not necessarily require alum. The most important synthetic sizing agents are the AKD sizing agents, i.e. the sizing agents based on alkyl ketene dimeter, and the ASA sizing agents, i.e. the sizing agents based on alkenyl succinic anhydride. It is assumed that esterification reactions occur between these sizing agents and the hydroxyl groups of the cellulose fibres, so that these reactions attach the sizing agent to the fibre.

The reactions between the AKD sizing agents and the hydroxyl groups of the cellulose fibres take place very slowly. The final sizing of the paper is reached only after several hours after the papermaking is finished, which causes some disadvantages. Due to the long reaction time the paper or board sized with the ADK sizing agent can not be directly supplied to its final use, but the paper or board must be stored on rolls, generally for at least one day, before the final sizing is obtained. This requires extra storage space.

The ASA sizing agents are more reactive and they react with the cellulose more strongly and rapidly than the AKD sizing agents, i.e. generally already in the drying section of the paper machine. The reactive ASA sizing agents thereby react faster than other sizing agents also with water. The reactivity regarding water may cause sticking in the paper machine, if there is not a rapid retention of the size and a rapid reaction between the sizing agent and the fibres.

The market has seen different latex materials as the newest stock sizes, styrene acrylates being the most commonly used. The advantage of these sizing agents is that they do not form covalent bonds with the fibres, whereby the hydrophobic effect can be found also during the formation of the paper web. Cationic latex materials are attached to the fibres due to their surface charge. However, as a result of the strong cantionicity these products increase the paper's porosity by some amount.

It is known to use styrene maleic acid as such as the surface hydrophobic agent in the surface sizing agents in order to give a higher hydrophobicity to the surface of the paper or board. The salt of the styrene maleic acid is an anionic molecule, and therefore there will be no natural retention to anionic fibres and it is not suitable for the use as a stock size.

The article "A new sizing agent; styrene-maleic anhydride copolymer with alum or iron mordants", T. Wang, J. Simonsen and C. Biermann, Tappi Journal Vol. 80, No. 1, p. 277–281 proposes to use an SMA sizing agent, i.e. styrene maleic anhydride size, as the stock size. The article proposes the use of alum or iron chloride in order to provide retention of the size to the fibre. However, the article concludes that stock sizing of only unbleached paper will be successful with this sizing agent.

The object of the present invention is to provide an improved stock size and a method for preparation of size, where the above-mentioned disadvantages are minimised.

An object is then to provide a stable stock size, which is simple to prepare and advantageous to use.

An object is also to provide a stock size, which can be widely used, for the sizing of both bleached and unbleached paper or board.

An object is further to provide a stock size, with which the sizing occurs already in the drying section of the paper machine.

In order to attain the above-mentioned objects the stock size, the method for preparing it, and its use, are characterised in what is defined in the characterising parts of the independent claims presented below.

A typical stock size according to the invention comprises a polymer based on styrene maleic acid and stabilised with a polysaccharide, such as starch or mannan. The polymer based on styrene maleic acid is a salt of styrene maleic acid, for instance ammonium salt of styrene maleic acid. The stock size according to the invention comprises typically 1 to 99%, advantageously 10 to 90%, most advantageously 30 to 70% of a polymer of styrene maleic acid, calculated as dry matter.

The polysaccharide used is typically oxidised and/or cationised starch, where the substitution level (DS) of the anionic and/or cationic groups is 0 to 2. Advantageously the starch is cationised so, that the substitution level of the cationic groups is 0 to 1, preferably 0.01 to 0.2, most preferably 0.01 to 0.05. The stock size contains typically 10 to 90% cationic starch, calculated as dry matter. The viscosity of the polysaccharide is advantageously over 5 mPas (5%, 60° C., Brookfield), more advantageously over 200 mPas, most advantageously over 400 mPas.

The polymer can be retained to the cellulose fibres with the aid of the polysaccharide part attached to the polymer. By using this polymer, which is stabilised by the polysaccharide, alum or other corresponding complex forming agent, such as polyaluminium chloride, is not required in such amounts as when using a polymer, which is not stabilised by polysaccharide. However, for instance alum, polyaluminium chloride and/or retention agent can be added to the stock in accordance with requirements. Alum or polyaluminium chloride can be added to the stock size in an amount of about 5 to 50% of the stock size dry matter. A retention agent can be added in an amount of about 1 to 20% of the stock size dry matter, when required.

The salt of styrene maleic acid acting as the sizing agent component is advantageously an ammonium, sodium, potassium or calcium salt, or alternatively a combination of said ion forms. A particularly advantageous salt is the ammonium salt of styrene maleic acid. The salt of styrene maleic acid may also contain other copolymerised monomers, such as different acrylates, butadiene, acrylamides or acrylonitriles. The salt of styrene maleic acid may be partly in an amide and/or imide form.

The styrene share of the salt of styrene maleic acid according to the invention can vary between 25 and 90%. A large amount of styrene is advantageous regarding this invention, because the hydrophobic properties of the sizing agent are particularly due to the styrene.

A sizing agent based on styrene maleic acid is typically stabilised so that starch flour in granule form or starch in solution is mixed into the size solution, and then the temperature of this mixture is raised, typically to 80–150° C., in order to bring about the reactions between the sizing agent and the starch. In a stabilisation occurring at lower temperatures the sizing agent and the starch granules are mixed until the starch granules are dissolved, i.e. for about 1 hour. However, the preparation is advantageously made with the aid of pressure in a steam jet cooker, where the mixing temperature is rapidly raised to >100° C., typically to 120–150° C. Then the reaction time is shortened to a few minutes. After the heating the solution is cooled to room temperature.

Another preparation manner is to add the starch already at the preparation stage of the salt of styrene maleic acid. Then starch, styrene maleic anhydride and a water solution of an alkali, such as ammonia, is mixed and heated, until a clear, brownish or yellowish solution is obtained.

One preparation manner according to the invention is to add 500 g starch flour in granule form to 5 kg of an ammonium salt solution of styrene maleic acid of 10% dry matter, whereby the starch flour has a nitrogen content of 0.4% dry matter and a viscosity of 110 mPas at 60° C. as a 30% solution. The pH of the starch should be at least 7. The starch is evenly suspended into the solution, and then the slurry is cooked at 140° C. in a high pressure steam jet cooker, which more generally is known by the name JET cooker. After the cooking the produced clear brownish solution is cooled to room temperature.

The size based on starch according to the invention presented above has a good retention to the fibre suspension, whereby it can be used as a stock size. The size is attached to the fibres already in the drying section of the paper machine, and it does not require extra storage. The solution form of the size is advantageous regarding the even distribution of the size, and thus it provides an even effect in the finished paper web.

The starch-based salt of styrene maleic acid provides many advantages and new applications, in comparison to a form comprising of only salt. The size is suitably used as stock size without alum or corresponding other complex forming agent, such as polyaluminium chloride, or with only very small amounts of complex forming agents. The starch-based size has further an essentially lower tendency to foam than the agent comprising of only salt of styrene maleic acid, whereby it is easy to use. This lower foaming is particularly advantageous in surface sizing applications.

As a stock size the salt of styrene maleic acid based on starch is particularly suitable to be used in the manufacturing of liquid packaging board. In the liquid packaging board manufacture improvements in the resistance to different liquids can be obtained, which is necessary, for instance, if the actual coating is damaged. In addition the size gives a low porosity and a good stiffness to the board. Generally it can also be said that the stock size according to the invention gives a good wet strength and dry strength to paper.

The salt of styrene maleic acid stabilised by starch according to the invention is particularly suitable as a stock size for base paper which is made for coating purposes. The size increases the hydrophobicity and lowers the paper's porosity and prevents the coating from penetrating into the base paper at the coating stage.

The stock size stabilised by starch according to the invention is also very suitable as a stock size in printing paper or fine paper. This stock size will suitably reduce the penetration of ink into the paper. The stock size according to the invention is further particularly well suited for use in sizing fine paper, as an addition to another stock size, such as AKD size or ASA size. The size according to the invention can also be used as an additive to the surface size in surface sizing.

The stock size according to the invention is also suitably used as a protective colloid for AKD, ASA and/or for a resin dispersion, which is to be added to the stock of paper or board, and also for the pre-treatment of filler, such as PCC, which is to be added to the stock. Typically the stock size according to the invention is added to the fibre stock before the fibre stock is supplied to the head box.

The feasibility of the invention is illustrated by the following examples.

EXAMPLE 1

In this test the liquid absorption (Cobb60) of the salt of styrene maleic acid (SMA) and a corresponding starch-stabilised size (StSMA) at different pH values were compared. In the laboratory a 2% mixture of fibre pulp which contained 60% birch pulp and 40% pine pulp was made. Then the size was added as a 10% solution to the pulp, as an amount which was 3% of the pulp. Alum was added as an 1% solution according to Table 1 below. A retention agent (BMA 590) was added as an amount of 0.02% of the stock.

The size, the SMA or the starch stabilised SMA (St SMA) was added to the pulp, and the pulp was stirred for 30 seconds. Then in some cases alum was added. Then the pulp was mixed another 1.5 minutes. The mixture was poured into a sheet mould, to which the retention agent was dispensed, as a 0.5% solution. The sheets, 140 g/m$^2$, made in this way were dried in a rapid dryer. The absorption of water was measured by a Cobb60 measurement. The test results are presented in Table 1.

TABLE 1

| Test | Alum | PH | SMA | StSMA | Cobb60 |
|---|---|---|---|---|---|
| 1 | 0.50% | 7 | 3% | — | >100 |
| 2 | 0.50% | 7 | — | 3% | 20 |
| 3 | 1.00% | 5 | 3% | — | >100 |
| 4 | 1.00% | 5 | — | 3% | 23.6 |

In the table it can be seen that the liquid absorption Cobb60 is 20 and 23.6 for the sheet which is sized with the starch-stabilised salt of styrene maleic acid, and this is substantially lower than the liquid absorption for sheets which were sized with conventional salt of styrene maleic acid, the later being >100. Thus the sheet sized with the starch-based salt of styrene maleic acid stabilised by starch according to the invention has a better sizing level and water resistance.

EXAMPLE 2

In this test the characteristics obtained with a cationic styrene acrylate sizing agent were compared with the starch-stabilised salt of styrene maleic acid according to the invention.

In a test paper machine paper from a pulp of birch/pine (70/30) was manufactured, to which per produced paper ton was added

| | | |
|---|---|---|
| Starch | Raisamyl 135 sp | 7 kg/t |
| Retention agent | Percol 162 | 100 g/t |
| Retention agent | Hydrocol O | 1.5 kg/t |
| Filler material | GCC | 100 kg/t |
| Grammage of paper | | 49.2 to 52.8 g/m$^2$ |
| Thickness of paper | | 62 to 65 $\mu$m |

As the sizing agent cationic styrene acrylate (acryl.) and the starch-based salt of styrene maleic acid (StSMA) according to the invention was used. In the tables 2 and 3 it is presented how these sizing agents affect the paper's porosity (Bendtsen; ml/min), the strength in the z direction (Bonding; J/m$^2$), tensile index (machine direction and cross direction; Nm/g), tensile stiffness (machine direction and cross direction; MNm/kg), burst index (kPam$^2$/kg), picking resistance (Dennison, surface and base), friction (static and kinetic), drop test (surface and base; s), and the absorbency (Cobb30, surface and base; g/m$^3$).

TABLE 2

| Size | Acryl. 0.15% | Acryl. 0.3% | Acryl. 0.6% | Acryl. 1.0% |
|---|---|---|---|---|
| Bendtsen ml/min | 1170 | 1460 | 1370 | 1295 |
| Bonding | 344 | 374 | 357 | 355 |
| Tensile index, md | 57.49 | 58.53 | 60.11 | 59.94 |
| Tensile index, cd | 32.5 | 32.97 | 33.45 | 33.71 |
| Tensile stiffness, md | 8.636 | 8.729 | 8.685 | 8.748 |
| Tensile stiffness, cd | 3.648 | 3.892 | 3.823 | 3.713 |
| Burst index | 2.55 | 2.63 | 2.66 | 2.52 |
| Dennison, surf | 10 | 9 | 11 | 11 |
| Dennison, base | 12 | 10 | 12 | 12 |
| Friction, static | 0.631 | 0.589 | 0.551 | 0.621 |
| Friction, kinetic | 0.498 | 0.488 | 0.427 | 0.546 |
| Drop test, surf | 54.3 | 75.7 | 111.7 | >180 |
| Drop test, base | 65.3 | 68.7 | 111.7 | >180 |
| Cobb30, surf | 56.0 | 56.1 | 52.4 | 48.4 |
| Cobb30, base | 57.2 | 53.9 | 54.3 | 49.6 |

In Addition Table 3 presents test results from a run where the stock size was not used.

TABLE 3

| Size | — | StSMA 0.15% | StSMA 0.3% |
|---|---|---|---|
| Bendtsen (ml/min) | 1300 | 1095 | 765 |
| Bonding | 141 | 451 | 524 |
| Tensile index, md | 55.5 | 67.42 | 70.51 |
| Tensile index, cd | 27.77 | 36.18 | 38.56 |
| Tensile stiffness, md | 8.457 | 9.228 | 9.717 |
| Tensile stiffness, cd | 4.196 | 4.260 | 4.261 |
| Burst index | 2.47 | 2.99 | 2.98 |
| Dennison, surf | 6 | 11 | 12 |
| Dennison, base | 7 | 11 | 13 |
| Friction, static | 0.627 | 0.657 | 0.675 |
| Friction, kinetic | 0.527 | 0.570 | 0.583 |
| Drop test, surf | 42.0 | 87.6 | 124.6 |
| Drop test, base | 47.6 | 80.0 | 136.0 |

TABLE 3-continued

| Size | — | StSMA 0.15% | StSMA 0.3% |
|---|---|---|---|
| Cobb30, surf | 58.1 | 53.2 | 53.2 |
| Cobb30, base | 59.4 | 52.5 | 54.0 |

From the tests, it can be concluded that the size according to the invention provides a lower porosity (Bendtsen), the same hydrophobicity (drop test, Cobb), an improved stiffness (tensile stiffness) and strength than the cationic styrene acrylate.

What is claimed is:

1. A method for preparing a stable cationic size for use in the making of paper or board, the size containing a polymer formed from a derivative of styrene maleic acid, said method comprising:

(i) mixing a cationic starch with a polymer solution containing a polymer derived from styrene maleic acid; and thereafter (ii) heating the polymer solution thus obtained in step (i) to a reaction temperature of greater than 100° C. to form a stabilized cationic size.

2. A method according to claim 1, wherein the derivative of styrene maleic acid is a salt of styrene maleic acid.

3. A method according to claim 1, wherein step (i) comprises mixing a dispersion of the cationic starch with the polymer solution containing the polymer derived from styrene maleic acid.

4. A method according to claim 1, further comprising (iii) adding alum, polyammonium chloride and/or a retention agent the stabilized cationic size.

5. A method of using the stabilized cationic size made according to claim 1, comprising adding the stabilized cationic size to pulp stock during the manufacture of liquid packaging board.

6. A method of using the stabilized cationic size according to claim 1, comprising adding the stabilized cationic size to pulp stock in the manufacture of base paper intended for coating.

7. A method of using the stabilized cationic size made according to claim 1, comprising incorporating the stabilized cationic size as a protective colloid for an AKD, ASA and/or resin dispersion, to be added to paper or board stock.

8. A method of using the stabilized cationic size made according to claim 1, comprising pre-treating a filler to be added to paper or board stock with the stabilized cationic size.

9. A method for stock sizing of fiber stock used in the manufacture of paper or board, comprising adding to the fiber stock upstream of a headbox, a stabilized cationic size made according to claim 1.

10. A method for stock sizing of a fiber stock used in the manufacture of paper or board, comprising treating an AKD, ASA and/or resin dispersion with a stabilized cationic size made according to claim 1, and thereafter adding the treated dispersion to the fiber stock.

11. A method of using the stabilized cationic size made according to claim 1, comprising adding the stabilized cationic size to a surface sizing composition.

12. A method according to claim 1, wherein step (ii) is practiced by raising the temperature of the polymer solution to greater than 100° C. in a steam jet cooker.

* * * * *